INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

FIG. 6 - NEUTRAL
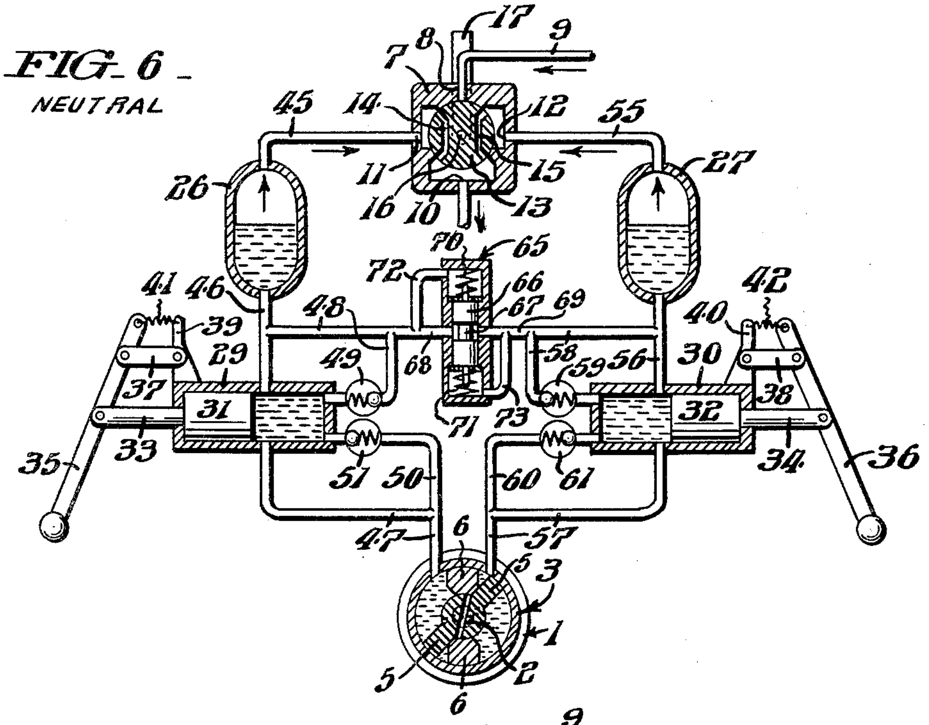
FIG. 7 - CLOSE (POWER)
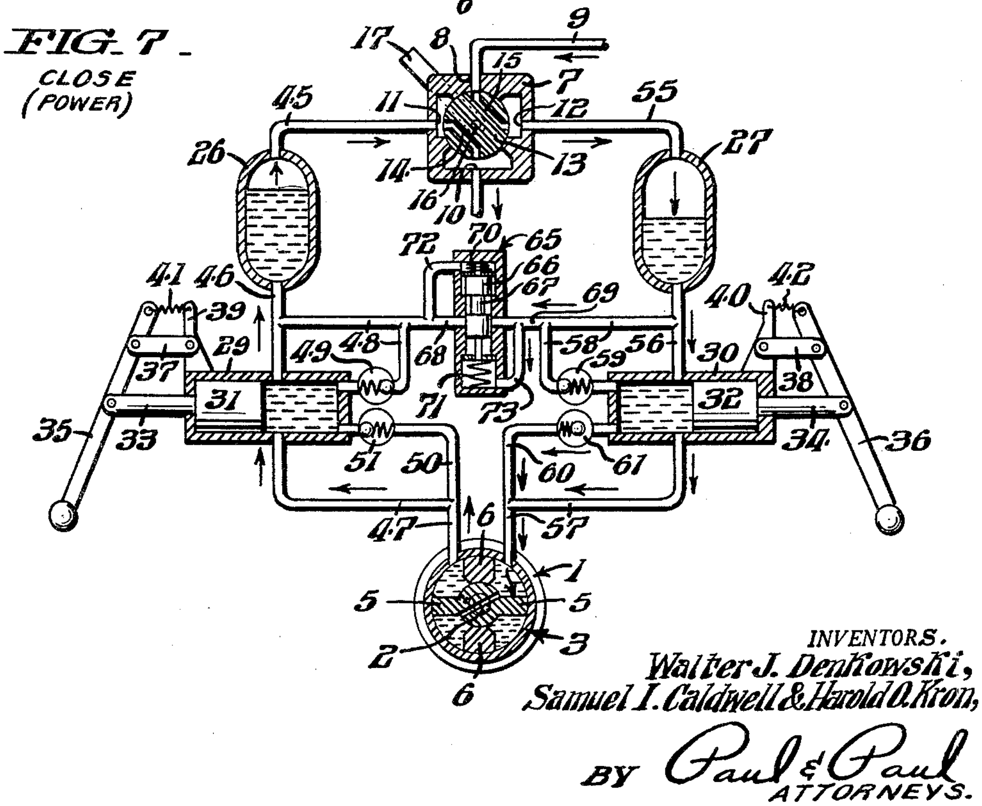
INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

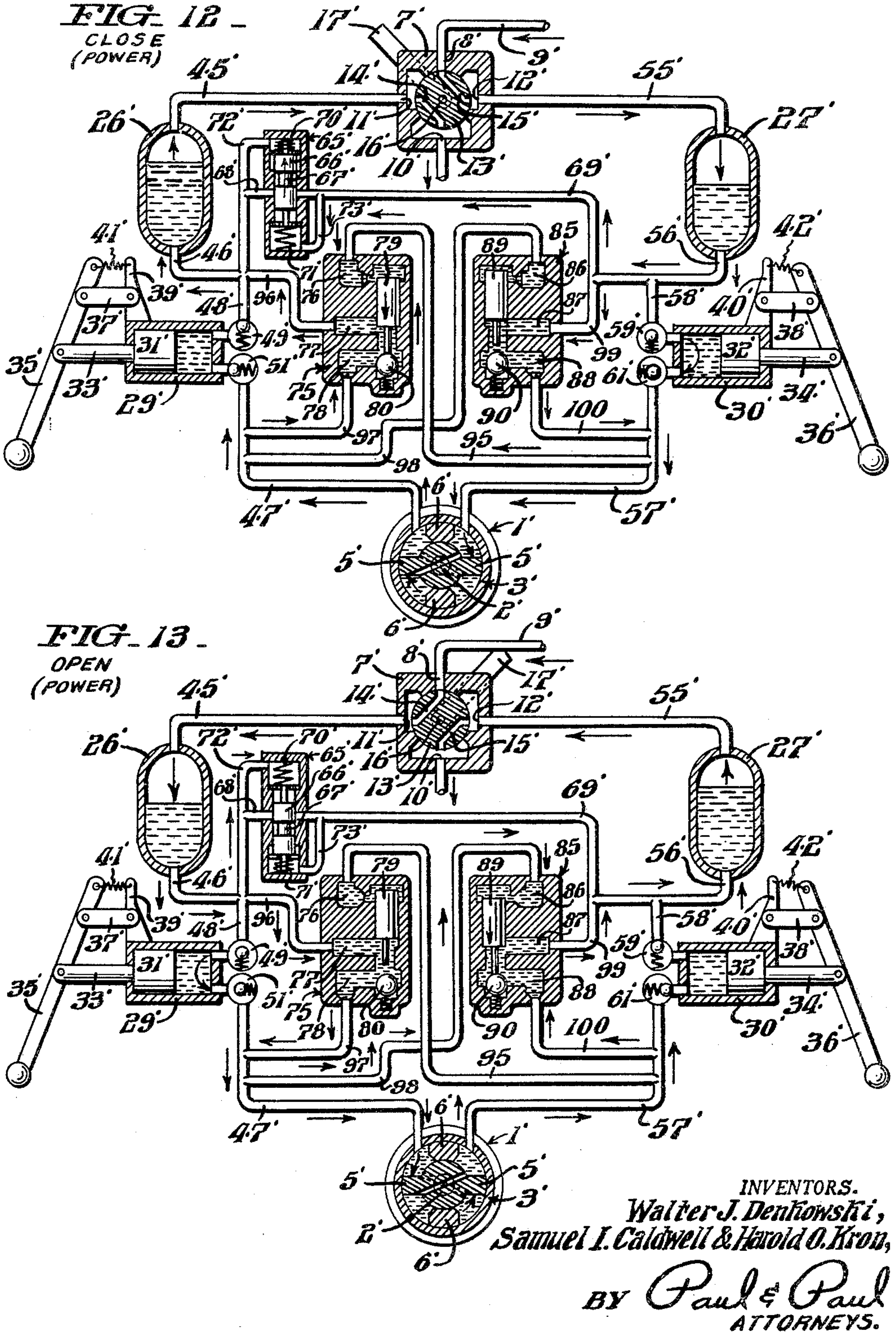
FIG. 12 (CLOSE (POWER)), FIG. 13 (OPEN (POWER))
INVENTORS.
Walter J. Denkowski,
Samuel I. Caldwell & Harold O. Kron,
BY Paul & Paul
ATTORNEYS.

FIG. 14 MANUAL CLOSE, FIG. 15 MANUAL OPEN
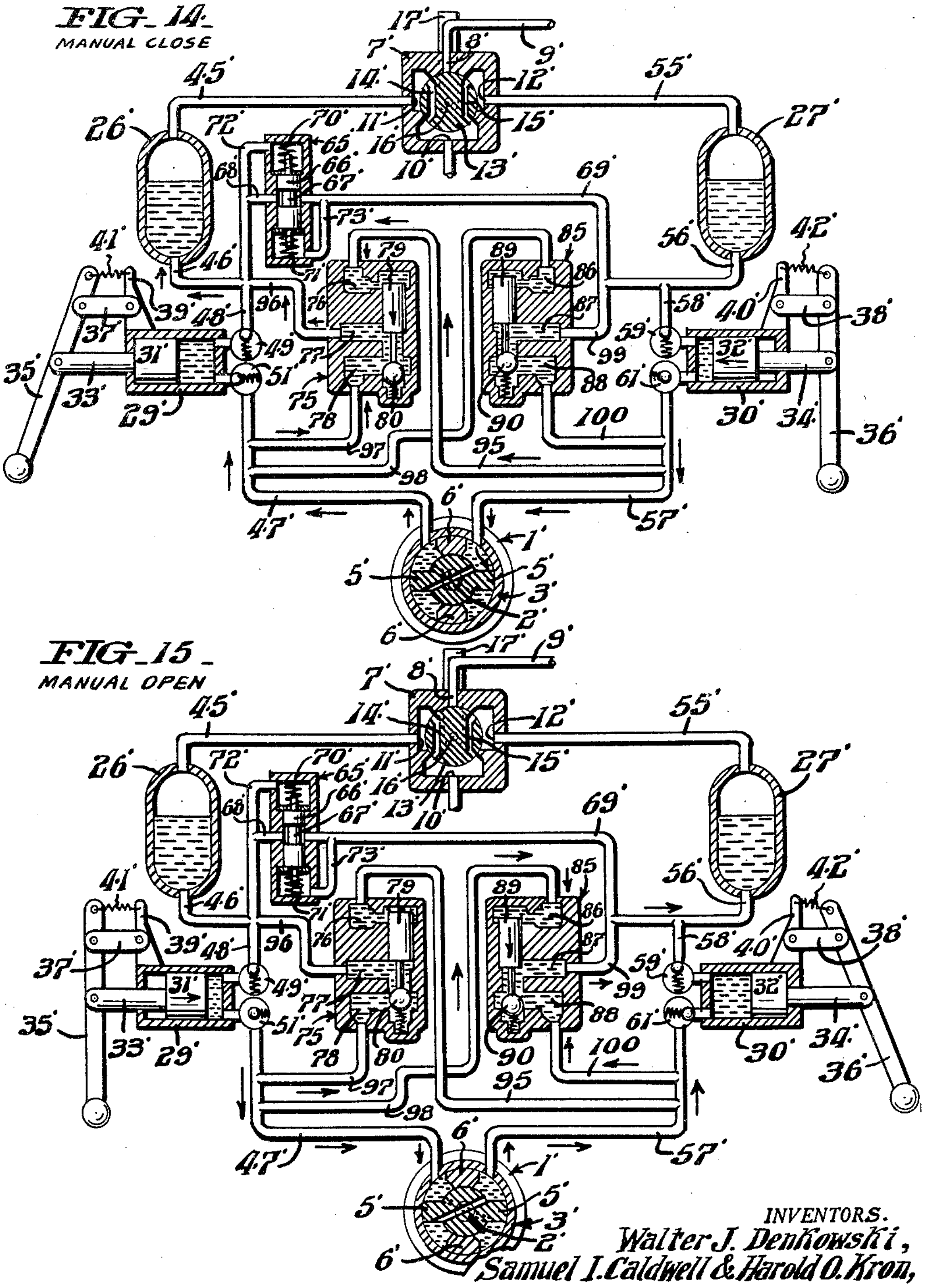
INVENTORS.
Walter J. Denkowski,
Samuel I. Caldwell & Harold O. Kron,
BY Paul & Paul
ATTORNEYS.

Dec. 25, 1962 W. J. DENKOWSKI ETAL 3,069,855

HYDRO-PNEUMATIC SYSTEMS FOR OPERATING REVERSIBLE TORQUE ACTUATORS

Filed Jan. 26, 1961 13 Sheets-Sheet 10

INVENTORS.
Walter J. Denkowski,
Samuel I. Caldwell & Harold O. Kron,
BY Paul & Paul
ATTORNEYS.

INVENTORS.
Walter J. Denkowski,
Samuel I. Caldwell & Harold O. Kron,
BY Paul & Paul
ATTORNEYS.

Dec. 25, 1962 W. J. DENKOWSKI ETAL 3,069,855

HYDRO-PNEUMATIC SYSTEMS FOR OPERATING REVERSIBLE TORQUE ACTUATORS

Filed Jan. 26, 1961 13 Sheets-Sheet 12

INVENTORS.
Walter J. Denkowski,
Samuel I. Caldwell & Harold Kron,
BY Paul & Paul
ATTORNEYS.

MANUAL CLOSE

INVENTORS
Walter J. Denkowski,
Samuel I. Caldwell & Harold Kron,
BY Paul & Paul
ATTORNEYS.

3,069,855

HYDRO-PNEUMATIC SYSTEMS FOR OPERATING REVERSIBLE TORQUE ACTUATORS

Walter J. Denkowski, Huntingdon Valley, Samuel I. Caldwell, Drexel Hill, and Harold O. Kron, Philadelphia, Pa., assignors to Philadelphia Gear Corporation, King of Prussia, Pa., a corporation of Pennsylvania Filed Jan. 26, 1961, Ser. No. 85,060
16 Claims. (Cl. 60—51)

This invention relates to hydro-pneumatic systems for operating reversible torque actuators such as are used, for example, to open and close large plug or butterfly valves in trunk lines or conduits through which gas, water or other fluids are conveyed over long distances; the present application being a continuation-in-part of a prior application, Serial No. 824,571, filed by us on July 2, 1959, and now abandoned. More specifically, our invention is concerned with an operating system for a reversible actuator wherein separate pipes, having interposed therein, tanks for a liquid, which may be oil or water, lead to opposite ports of the actuator, and a multi-way hand control valve by which compressed gas or air can be selectively admitted into said tanks over the liquid so as to displace liquid from them into the opposite sides of the actuator and thereby cause the rotor of the actuator to turn in one direction or the other as required to open or close the trunk line valve.

The chief aim of our invention is to provide, in a system of the kind referred to, simple facilities by which, in the event of failure in the supply of the compressed gas or air, the torque actuator can be operated manually through the liquid medium with a minimum of effort to open or close the trunk line valve. This objective is attained through provision of two separate hand pumps which are instantly available for operation at all times without the necessity for pre-setting any special valves or auxiliary appurtenances.

In connection with a reversible actuator operating system having the above attributes and wherein the control valve is remotely located, it is a further aim of our invention to provide simple manual facilities whereby, in the event that the trunk line valve should stick, leak or require repairs, an inspector in the field can prevent flow of the hydraulic medium to the actuator notwithstanding operation of said control valve at the remote location.

How the foregoing and other important objects and advantages are realized in practice will appear from the following detailed description of the attached drawings, wherein:

FIG. 6 is a diagrammatic representation of the apparatus in dormant condition, with the rotor of the actuator positioned in correspondence with the open position of the trunk line valve;

FIGS. 7, 8, 9 and 10 are views similar to FIG. 6 showing various steps in the operation of the apparatus;

FIGS. 11–15 are diagrammatic views similar to FIGS. 6–10 showing a modified embodiment;

Figure 1:
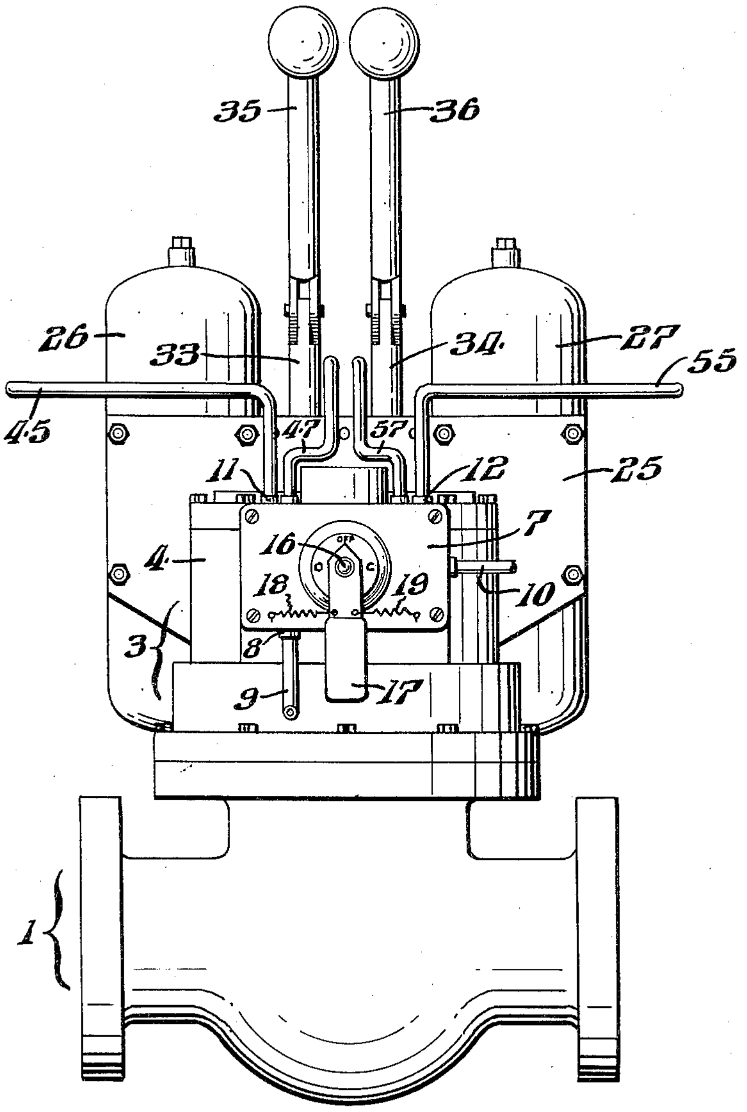
FIG. 1 shows, in front elevation, a hydro-pneumatic power system for operating a reversible torque actuator in which is incorporated an emergency operating means conveniently embodying our invention.

With more specific reference first to FIGS. 1–4 of these illustrations, the numeral 3 comprehensively designates a reversible hydraulic actuator which may be of any approved commercially available type having a vaned rotor 5 restricted to a semi-rotation in either direction by diametral partitioning walls stop abutments 6 within its housing 4. The actuator 3 may be utilized, for example, as a means for opening and closing a large valve 1 in a trunk line through which gas or other fluids are conducted over long distances. As illustrated in FIG. 1, the housing 4 of the actuator 3 is bolted to the top of the valve 1, and its shaft 2 is spline connected to the upper protruding end of the stem of said valve. Affixed to the front of the actuator housing 4 is a four-way manual control valve 7 which, as diagrammatically shown in FIG. 6, has an inlet port 8 connected to a pipe line 9 leading from a source (not shown) of gas or air under pressure, an exhaust port 10, and lateral flow ports 11 and 12 respectively. The rotor 13 of the control valve 7 is provided with a pair of parallel transverse passages 14 and 15, and, on the protruding end of its shaft 16, with a manipulating handle 17. By means of the springs indicated at 18 and 19 in FIG. 1, the handle 17 is normally maintained yieldingly in the position with the rotor of the control valve 7 in the neutral position of FIG. 6. Instead of being affixed to the actuator housing 4, it is to be understood that said control valve may be located in some instances, at a remote point.

Figures 2, 5:
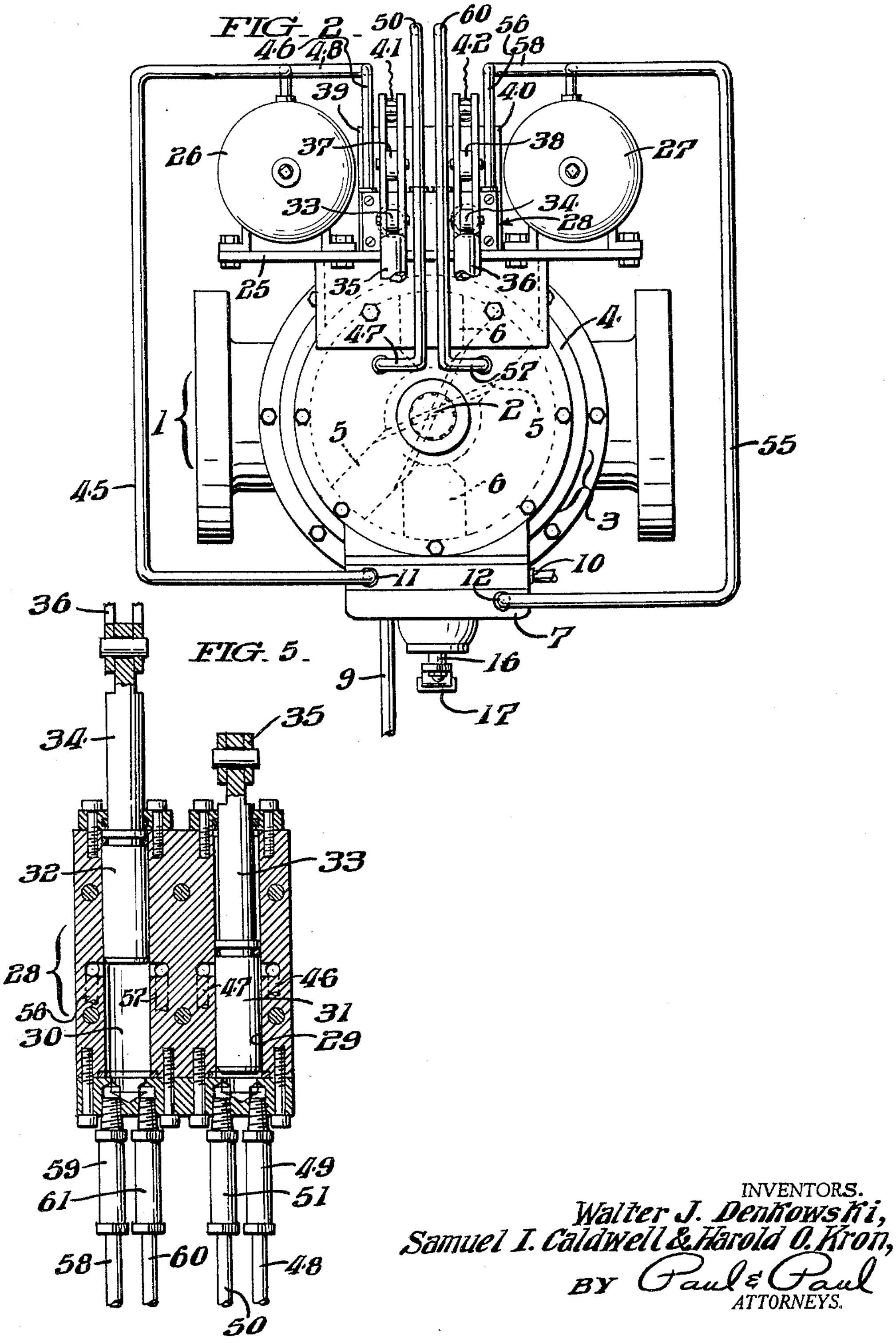
FIG. 2 shows the apparatus in top plan.
FIG. 5 is a detail sectional view taken as indicated by the angled arrows V—V in FIG. 3 and drawn to a larger scale.
Figure 3:
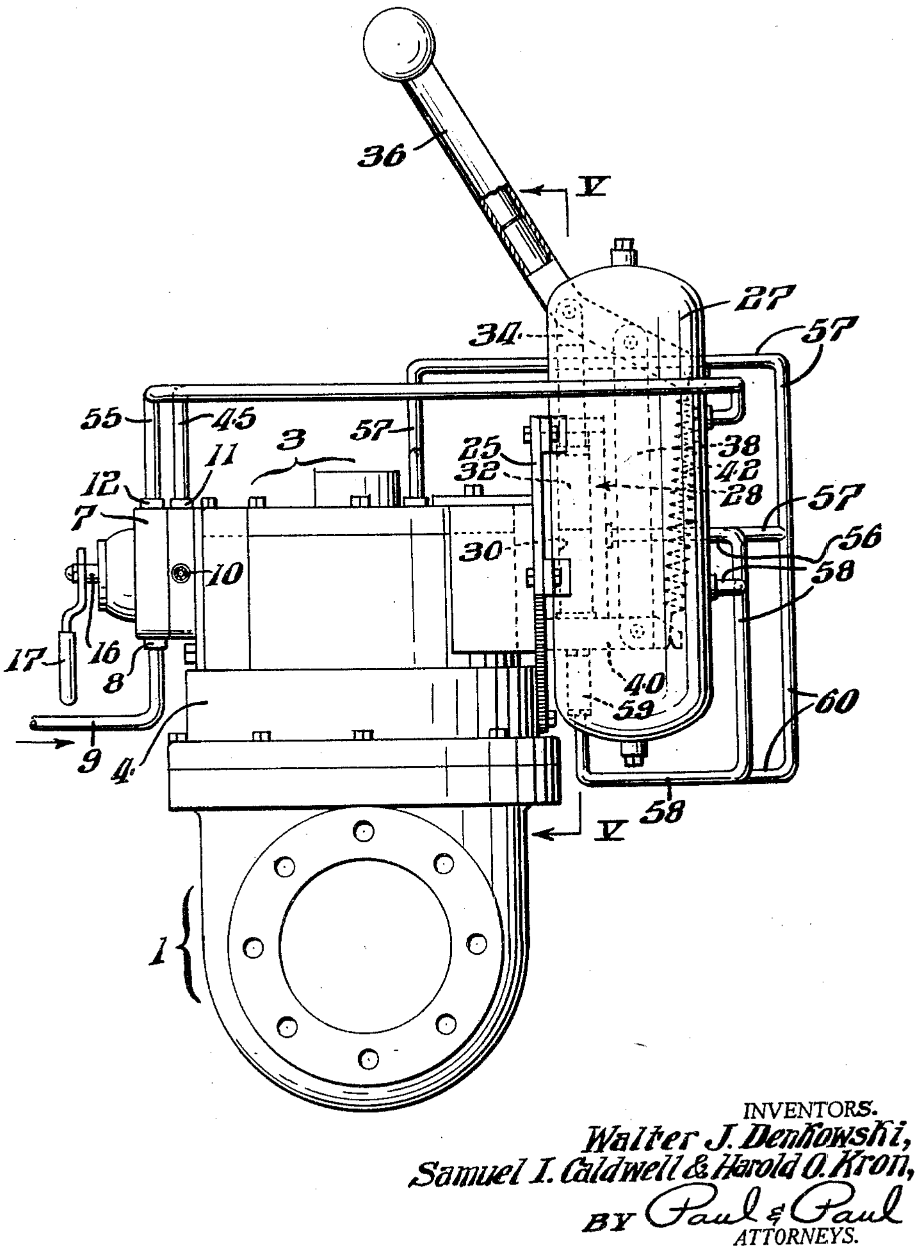
FIG. 3 shows the apparatus in end elevation as viewed from the right of FIG. 1.
Figure 4:
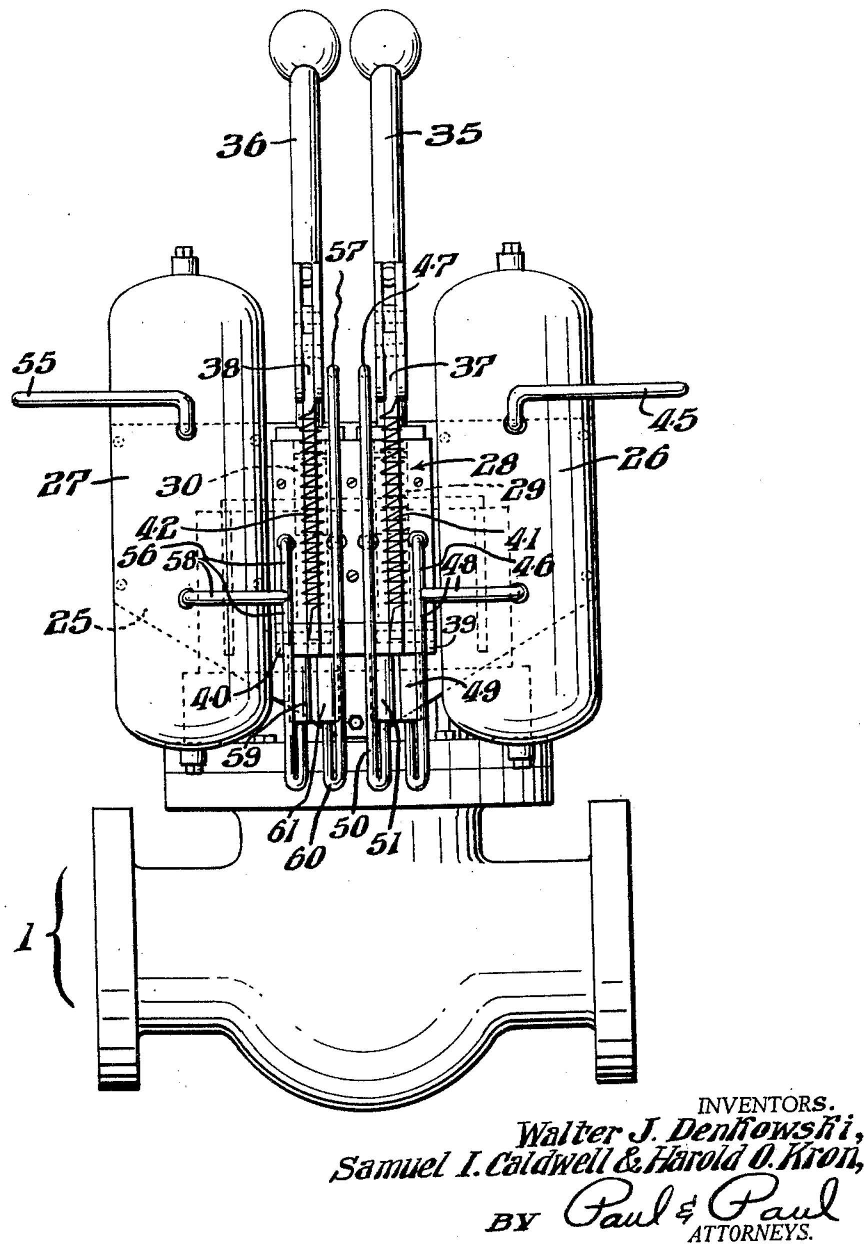
FIG. 4 shows the rear elevation of the apparatus.

Bolted to the top of the actuator 3 is an upright bracket 25 (FIGS. 1 and 2) whereto are bolted in turn at the rear, tanks 26 and 27; and rigidly supported by the bracket between said tanks is a block 28 which, see FIG. 5, provides two pump cylinders 29 and 30 having pistons 31 and 32 respectively therein. The rod extensions 33 and 34 of the pistons 31 and 32 are connected to hand levers 35 and 36 which are fulcrumed to links 37 and 38 pivoted, respectively, to bearing lugs 39 and 40 on the block 28, and which, see FIG. 1, extend forwardly in the interval between the tanks 26 and 27. Normally, the pistons 31 and 32 are held retracted in the cylinders 29 and 30 by springs 41 and 42 which are influential upon the levers 35 and 36. By means of a pipe section 45, the port 11 of the control valve 7 is connected to the upper end of the tank 26. The lower end of the tank 26 is in communication, through pipe section 46, wtih the cylinder 29 which latter is also in communication, by way of a pipe section 47, with the lefthand port of the actuator. As best seen in FIGS. 5 and 6, the pipe sections 46, 47, 56 and 57 respectively connect laterally into the cylinders of the pumps 29 and 30, at points substantially medially of the length of said cylinders and are cleared when the pistons 31 and 32 are normally retracted as in FIG. 6. A by-pass branch pipe 48, having a check valve 49 interposed therein, extends from the pipe section 46 and connects into the rear end of the cylinder 29. Another by-pass branch pipe 50, having a check valve 51 interposed therein, extends from the pipe section 47 and connects likewise into the bottom or rear end of the cylinder 29. The port 12 of the control valve 7 is connected by a pipe section 55 with the top end of the tank 27, the lower end of said tank being in communication, by way of a pipe section 56, with the upper end of the cylinder 30 which latter is in communication, by way of a pipe section 57, with the righthand port of the actuator 3. A branch by-pass pipe 58 with an interposed check valve 59 therein extends from the pipe section 56 to the bottom or rear end of the cylinder 30. Here also, another by-pass pipe 60 with an interposed check valve 61 extends from the bottom or rear end of the cylinder 30 which is also in communication, by way of a pipe section 57, with the righthand port of the actuator 3. It is to be understood that the check valves 49, 51, 59 and 61 are all of the spring-biased ball or poppet type and open in response to fluid pressure in one direction only. The various component elements above described are diagrammatically represented in FIG. 6 which shows the apparatus in dormant condition with the trunk line valve 1 fully open.

In order to permit the liquid in the tanks 26 and 27 to seek a common level normally, we have added, see FIGS. 6–10, a double-acting valve 65 which is hidden in FIG. 1, said valve having a plunger 66 therein with a circumferential groove 67 medially of its length. Connecting into opposite sides of the body of valve 65 at the center are continuations 68 and 69 of pipes 48 and 58. By means of springs 70 and 71, the plunger 66 of valve 65 is normally maintained in its central or neutral position so that the pipes 48 and 58 are communicative normally by way of the groove 67 in said plunger to permit cross flow between the tanks 26 and 27, and hence equalization of the liquid level in them.

*Operation*

To close the conduit valve 1 by power the control valve 7 is turned by means of its handle 17 to the position in which it is shown in FIG. 7, with the result that pressurized gas or air will flow from the pipe line 9 through the passage 15 of said valve and through the pipe section 55 into the top of the tank 27. As a consequence, liquid is displaced downwardly from the tank 27 through the pipe section 56 and into the cylinder 30 from which the liquid is displaced in turn, through the pipe sections 57 and 60 (the check valve 61 opening automatically) into the righthand port of the hydraulic actuator 3 to turn the rotor thereof clockwise and close the trunk line valve 1, the check valves 49, 51 and 59 remaining closed during this operation. At the same time, part of the pressurized liquid will flow from the tank 27 through the pipe 58 and the by-pass pipe 73 into the bottom of the valve 65 and thus temporarily block flow of liquid from said tank to the tank 26. As the rotor 5 of the actuator 3 moves clockwise, as just explained, the liquid ahead of its vanes is forced outward through the pipe section 47 into the cylinder 29 and from thence through the pipe 46 into the tank 26, the air or gas in the top of said tank incidentally escaping by way of pipe section 45, channel 14 of control valve 7, and finally exhausting through the outlet 10 of said valve. Upon release of the handle 17 after the trunk line valve 1 has been fully closed, the control valve 7 is automatically returned to the normal neutral position of FIG. 6 by the pull of the spring 18 upon said handle, and the piston of the valve 65 caused to resume its normal central position.

Figure 8:
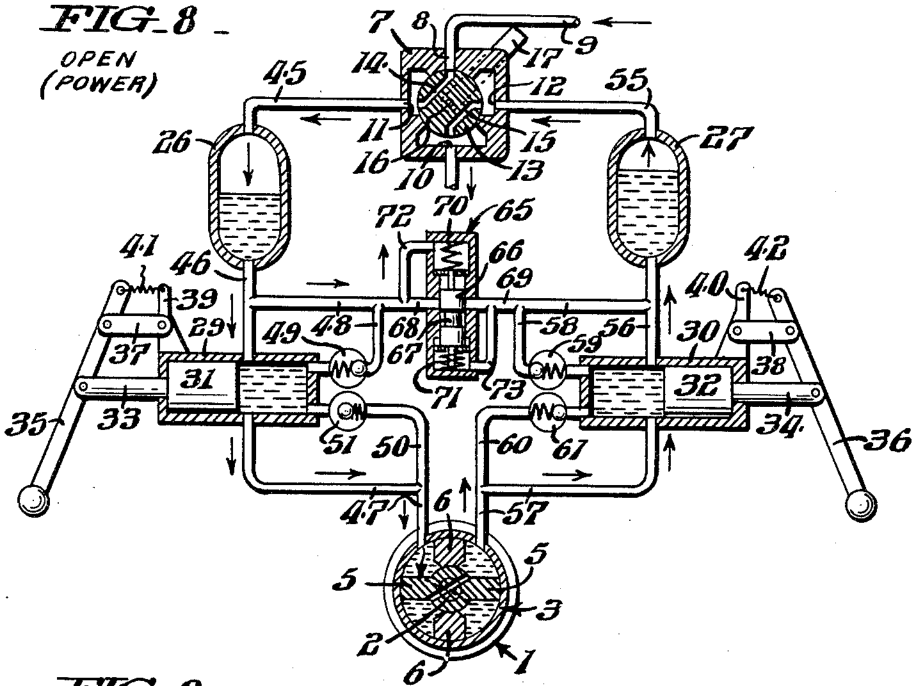
Figure 9:
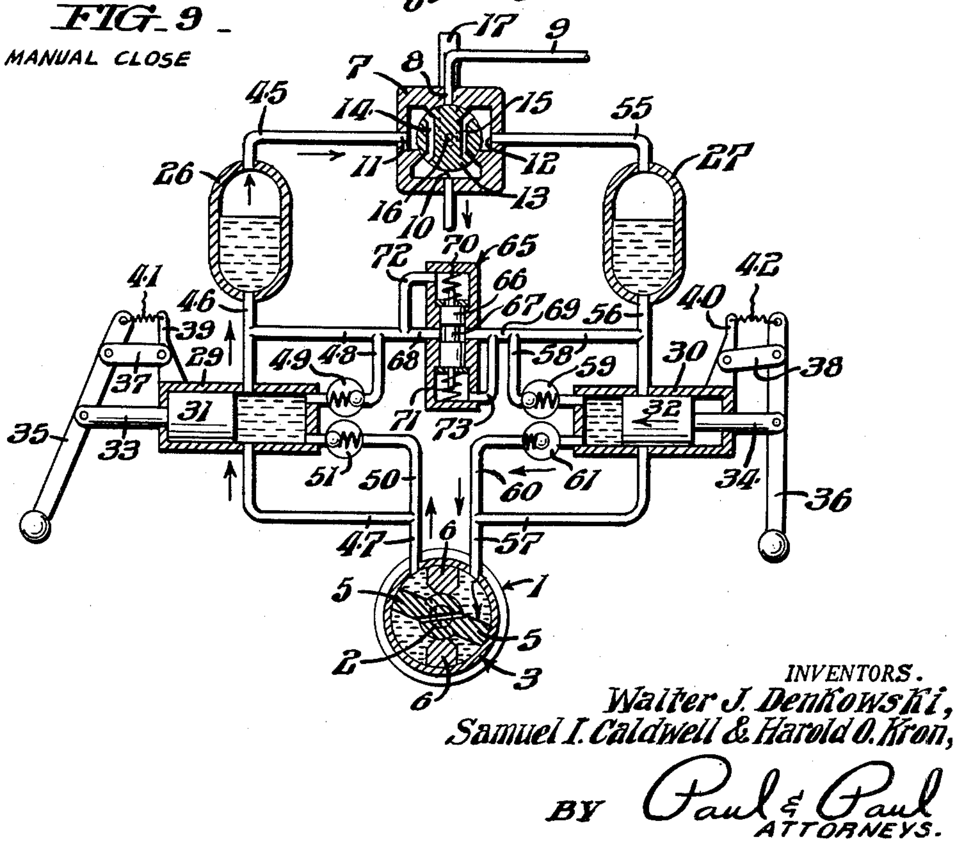

In the event of failure in the supply of pressurized gas or air to the control valve 7, the trunk line valve 1 can be closed by manual use of the pump 30 as in FIG. 9. During the forward strokes of the pump piston 32, liquid is forced from the cylinder 30 through the pipe 60 (the check valve 61 opening while the valve 59 remains closed) into the righthand port of the actuator 3 to cause the rotor 5 thereof to turn clockwise as required. On the other hand, during the retractive strokes of the piston 32 of pump 30 liquid is drawn from both tanks 26 and 27, from tank 27 through pipe 56 by-pass, pipe 58 (the check valve 59 opening and the valve 61 remaining closed) into the cylinder 30, and from tank 26 through piping 46, 48, 68, neutrally positioned valve 65, and piping 67. Thus by repeated reciprocations of the piston 32 of pump 30, the rotor of the actuator 3 will be progressively moved clockwise until the trunk line valve 1 is fully closed. It is to be noted that, during the last described procedure, the upper end of the tank 27 is in communication with the outside atmosphere by way of the pipe section 55, the channel 15 of the control valve 7, and the exhaust port 10 of said valve, the liquid concurrently displaced from the actuator 3 passes through pipe 47, the cylinder 29 and the pipe 46 into the tank 26 which likewise, is open to the atmosphere and also to the tank 27 by way of the pipes 48, 68, neutrality positioned valve 65, and pipes 58 and 56. To open the trunk line valve 1 under power, the control valve 7 is turned to the position in which it is shown in FIG. 8. As a result, pressurized air or gas from the pipe 9 is admitted into the top of the tank 26 by way of the channel 14 of control valve 7 and the pipe section 45, with consequent downward displacement of liquid from said tank through the pipe section 46 into the cylinder 29, and from thence through pipe section 47 and through the pipe section 50 (the check valve 51 automatically opening at this time) into the lefthand port of the actuator 3 to turn the rotor 5 counterclockwise and thereby cause the trunk line valve 1 to be opened, the check valve 49 remaining closed. During this operation, some of the pressurized liquid from the tank 26 will flow, by way of pipe section 48 and by-pass pipe 72, into the top of the valve 65, of which the piston 66 will be lowered to prevent flow to the tank 27. At the same time, the liquid displaced from the actuator 3 will flow upward through pipe section 57 into cylinder 30 and from said cylinder by way of the pipe section 56, into the tank 27 which is in communication with the outside atmosphere by way of the pipe section 55, the channel 15 of the control valve 7, and the exhaust port 10 of said valve 7.

Figure 10:
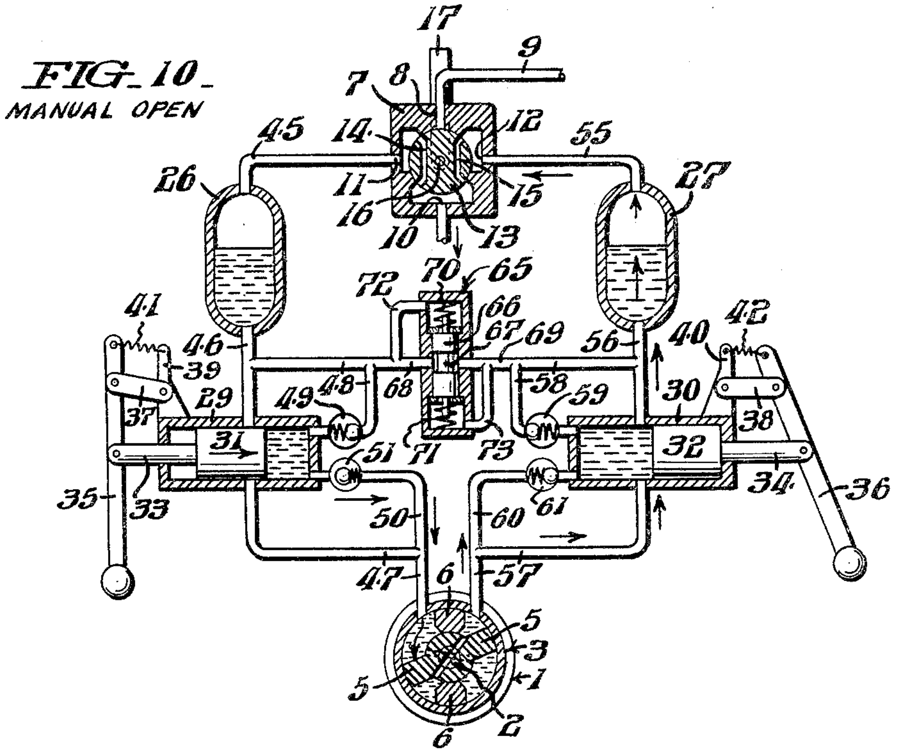
Figure 11:
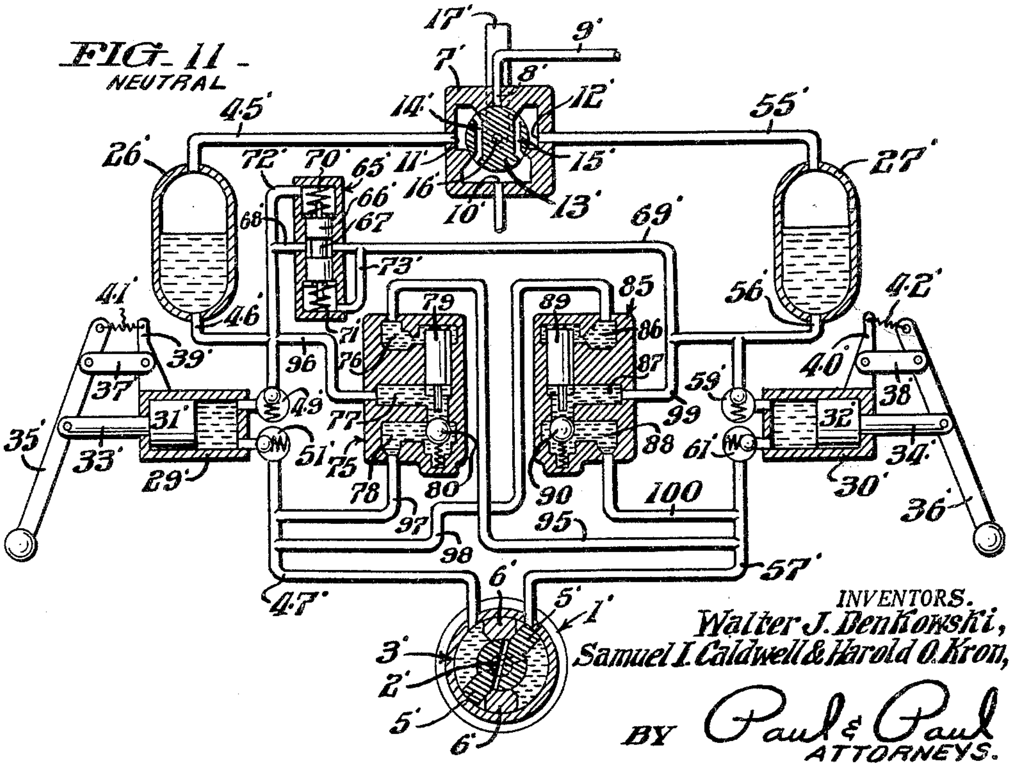
Figure 16:
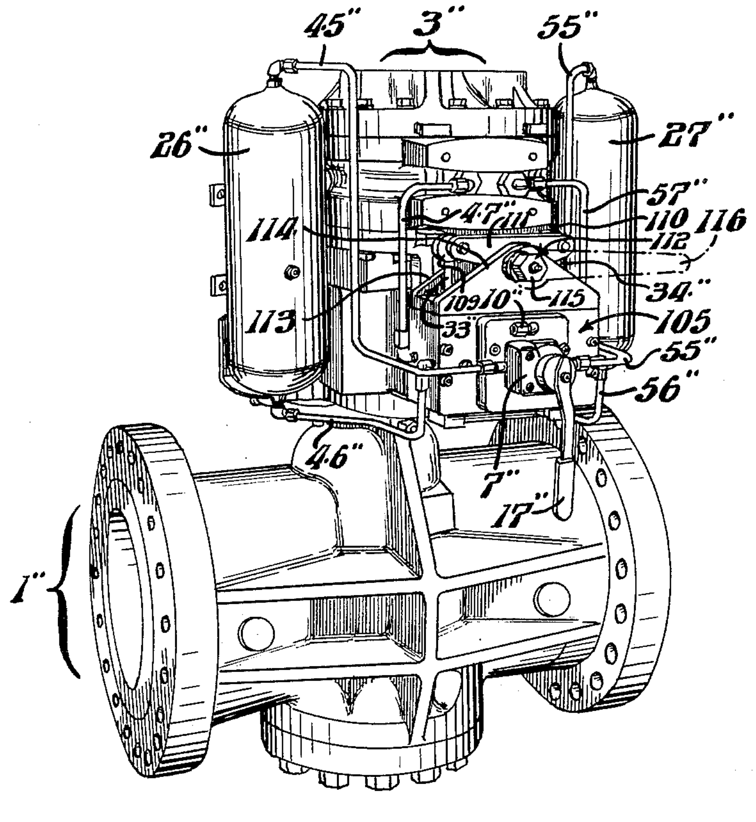
FIG. 16 is a perspective view of another modified apparatus according to the invention.

To open the trunk line valve 1 in the event of failure of the pressurized gas or air supply, the pump 29 is used as shown in FIG. 10. During the suction strokes of the piston 31 of pump 29, valve 49 opens to permit liquid to be drawn from the tank 26 through pipe section 48 into the cylinder 29. At the same time, liquid is also drawn from tank 27 by way of pipes 56, 58, 69, neutrally positioned valve 65 and pipe 48. During the inward or pressure strokes of said piston, the valve 51 opens and the charge of liquid previously drawn into the cylinder 29 is displaced through the pipe section 50 into the lefthand port of the actuator 3 of which the rotor is turned counterclockwise as required to open the trunk line valve. During the last described procedure, it will be noted that the upper end of tank 27 is in communication with the outside atmosphere for relief of the gas or air by way of pipe section 55, passage 15 of control valve 7, and the exhaust port 10 of the latter, to permit displacement of the liquid from the righthand port of the actuator 3 through the pipe 57, the cylinder 30 and pipe 56 into said tank 27 which is also in communication with the atmosphere.

*First Modification*

Except as hereinafter noted, the alternative embodiment illustrated in FIGS. 11–15 is identical with the first described embodiment and therefore, in order to obviate the necessity for repetitive description, all of the elements here having their counterparts in said first embodiment are identified by the same reference numerals previously employed, with addition in each instance however, of a prime for convenience of more ready distinction. In the present instance, two three-way valves 75 and 85 are utilized for a purpose presently explained. As shown, the body of valve 75 is subdivided into three chambers 76, 77 and 78, with a plunger 79 operative in a bore between the chambers 76 and 77, said plunger having a diametrically reduced stem adapted to act upon a ball 80 which is upwardly spring pressed to normally close a port between the chambers 77 and 78 as in FIG. 11. The casing of valve 85 is similarly subdivided internally into three chambers 86, 87 and 88, with a plunger 89 operative in a bore between the chambers 86 and 87 and having a diametrically-reduced stem extension adapted to act upon a ball 90 which is upwardly spring pressed to normally close a port between the chambers 87 and 88 likewise as in FIG. 11. The upper chamber 76 of valve 75 is connected by a pipe section 95 with the pipe 57′, the intermediate chamber 77 by a pipe section 96 with the pipe 46′, and the chamber 78 by a pipe section 97 with the pipe 47′. On the other hand, the upper chamber 86 of valve 85 is connected by a pipe section 98 with the pipe 47′, the intermediate chamber 87 by a pipe section 99 with the pipes 56′ and 69′, and the lower chamber 88 by a pipe section 100 with the pipe 57′. Here as in the first described embodiment, the two tanks 26′ and 27′ are in direct communication by way of piping 46′, 68′ a valve 65′ (of which the plunger 66′ is centrally positioned) and piping 69′, 56′ so that the liquid in said tanks is normally maintained at the same level.

To close the pipe line valve 1′ by power in this instance, the control valve 7′ is turned to the position of FIG. 12. As a consequence, pressurized air or gas is admitted, by way of pipe 55′, into tank 27′, with attendant displacement of liquid from the bottom of said tank, through pipe 56′, into the cylinder 30′ (the check valve 59′ opening in response to pressure to permit this) and the flow continuing from said cylinder through check valve 61′ (which likewise automatically opens) and pipe 57′ into the right side of the actuator 3′ to turn the rotor 5′ clockwise and so cause the trunk line valve 1′ to be closed. Part of the pressurized liquid displaced from the tank 27′ passes through pipes 56′ and 99 into the intermediate chamber 87 of valve 85, forcing the plunger 89 upward and the ball 90 downward, thereby permitting the diverted pressurized liquid to pass from the bottom chamber 88 of valve 85 through pipe section 100 and to join the flow enroute, by way of pipe 57′, to the right side of the actuator 3′. Some of the pressurized liquid displaced from tank 27′ will pass through pipe sections 69′ and 73′ into the bottom of valve 65′ and raise the plunger 66′ of the latter, and some by way of pipe section 95 into the upper chamber 76 of valve 75 to depress the plunger 79 and thereby move the ball 80 from its seat. As the rotor 5′ of the actuator 3′ turns clockwise, liquid is displaced from the left or opposite side of said actuator through pipe 47′ and connecting section 97 into the bottom chamber 78 of valve 75, the liquid flowing past the depressed ball 80 into the intermediate chamber 77 of valve 75, and finally through piping 96 and 46′ into tank 26′. During the rise of the plunger 89 in valve 85, the upper chamber 86 of said valve is relieved and the fluid, incidentally displaced therefrom, will flow through pipe section 98 and join the flow enroute, through pipe 47′, into tank 26′.

To open the trunk line valve 1′ by power, reference will be had to FIG. 13, the procedure being as follows: The control valve 7′ is turned clockwise, allowing pressurized air or gas from the line 9′ to pass, by way of pipe 45′, into the top of tank 26′ from which liquid is displaced through the pipes 46′ and 48′ (incidentally forcing check valve 49′ to open) into cylinder 29′, the flow continuing from said cylinder through piping 47′ into the lefthand port of the actuator 3′ the rotor 5′ is turned counterclockwise thereby to open the trunk line valve 1. Some of the pressurized fluid displaced from tank 26′ as above explained passes from pipe 46′ through pipe 96 into the central chamber 77 of valve 75, raising the plunger 79 and depressing the ball 80, flowing past the latter and, by way of pipe 97, joining the main flow in pipe 47′ enroute to the actuator 3′. Some of the pressurized liquid also flows from pipe 46′ through pipe section 72′ into the top of valve 65′, thereby depressing the plunger 66′ and interrupting cross communication between the tanks 26′ and 27′. Concurrently with the foregoing, the liquid displaced from the righthand port of the actuator 3′ flows through piping 57′ and 100 into the lower chamber of valve 85, and from thence, through the piping 99 and 56′, into the bottom of tank 27′ without traversing the cylinder of manual pump 30′.

In the absence of gas or air pressure in the line 9′, the trunk line valve 1′ can be closed manually by using the hand pump 30′. During the outward or suction strokes of the pump 30′, check valve 59′ automatically opens to permit withdrawal of fluid from the tanks 26 and 27′, while during the forward or inward strokes of the pump, the fluid previously drawn in, is displaced past check valve 61′ (which automatically opens) as in FIG. 14 through piping 57′ into the righthand port of actuator 3′ whereby the rotor 5′ thereof is turned clockwise to close the trunk line valve 1. Part of the displaced liquid passes, by way of pipe 95, into the upper chamber of valve 75, forcing the plunger 79 to depress the ball 80 so that the liquid displaced from the left side of the actuator 3′ may pass by way of piping 47′, 97 into the bottom and intermediate chambers of valve 75 and pipes 96, 46′ into the tank 26′, and also by way of the neutrally positioned valve 65 and pipes 69′ and 56′ into the tank 27′.

Manual opening of the tank line valve 1 in emergencies is accomplished by use of the hand pump 29′, incident to which liquid is drawn from the tank 26′ during the suction strokes of the pump and forced, during the pressure strokes of said pump is displaced past the check valve 51′, as in FIG. 15, and conducted, through pipe 47′, into the left side of the actuator 3′ with the result that the rotor of the latter is turned counterclockwise as required to open the trunk line valve 1′. Part of the liquid so displaced passes by way of pipe 98 into the upper chamber of valve 85, forcing the plunger 89 downward to depress the ball 90 so that the liquid displaced from the right side of the actuator 3′ may pass by way of pipes 57′ and 100 into the lower and intermediate chamber of valve 85 and from thence through the piping 99, 69′ neutrally positioned valve 65 and piping 68′, 46′ into the tank 26′ and also by way of the piping 99′ and 56′ into the tank 27′.

It is to be noted that during both power and manual operations of this first modified form of apparatus, the liquid displaced from the actuator 3′ and enroute to the tanks does not traverse the cylinders 29′ and 30′ as was the case in the corresponding operations of the first described embodiment.

*Second Modification*

Figure 17:
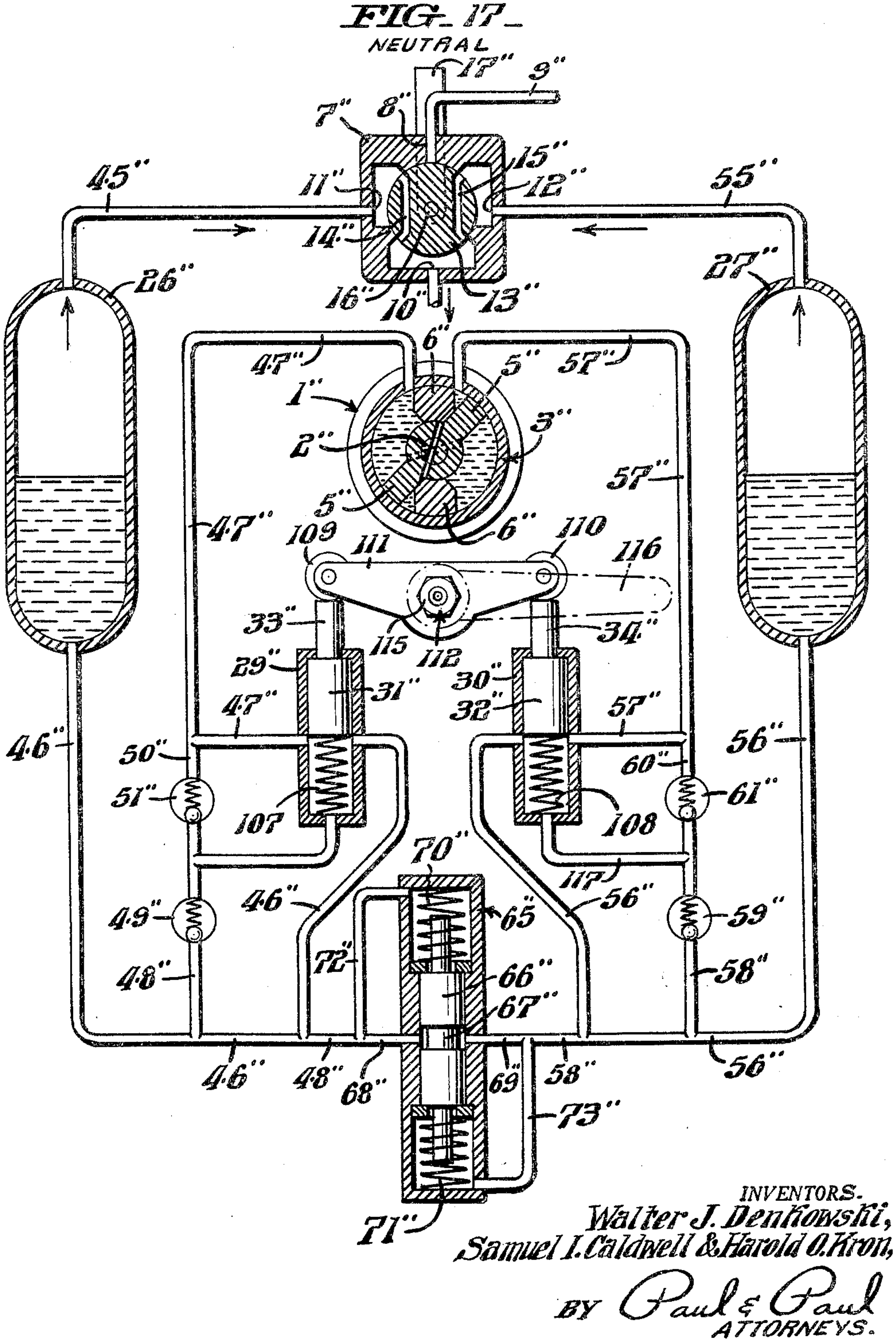
FIGS. 17–19 are diagrammatic representations of the modified apparatus of FIG. 16.
Figure 18:
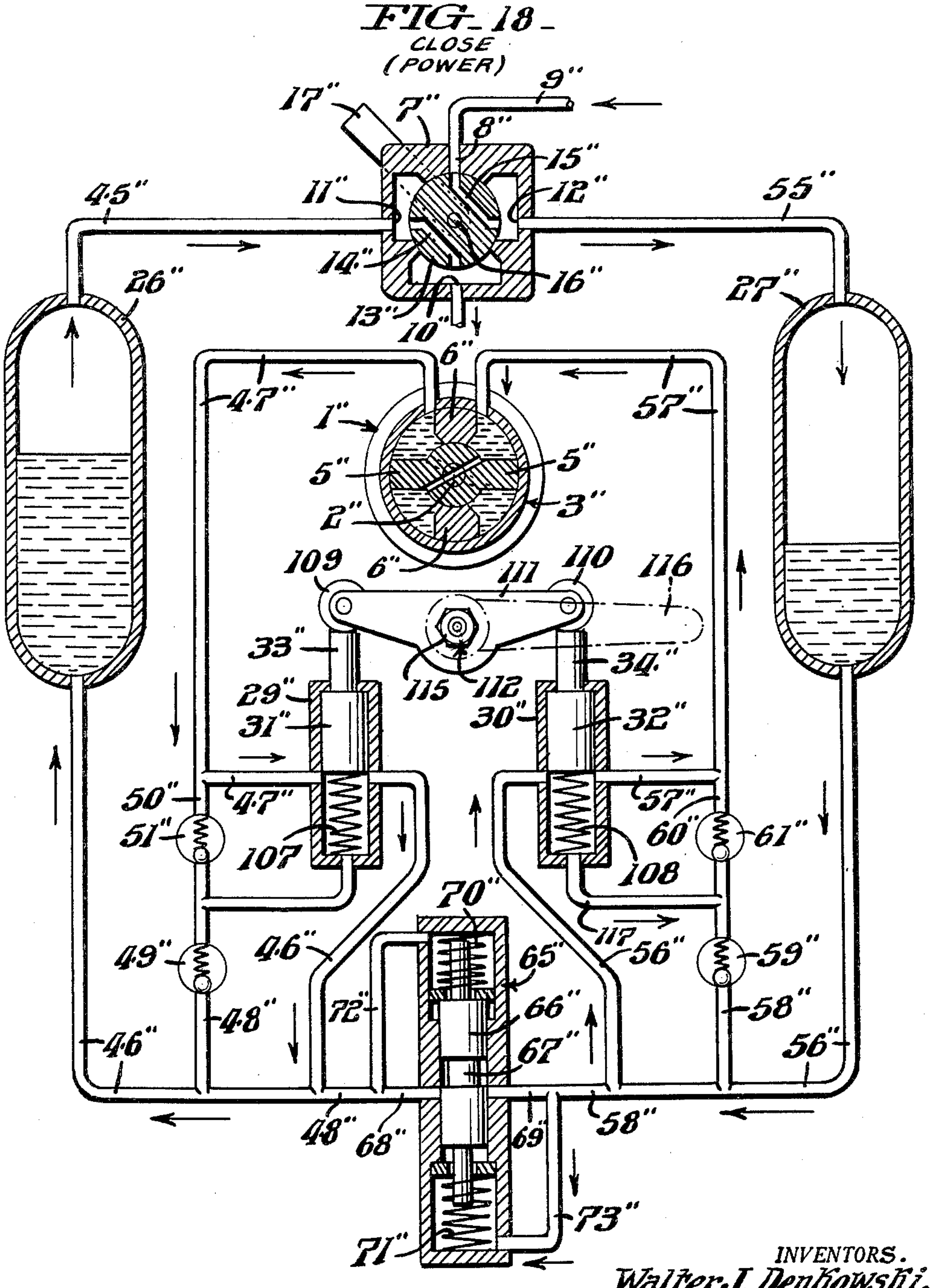
Figure 19:
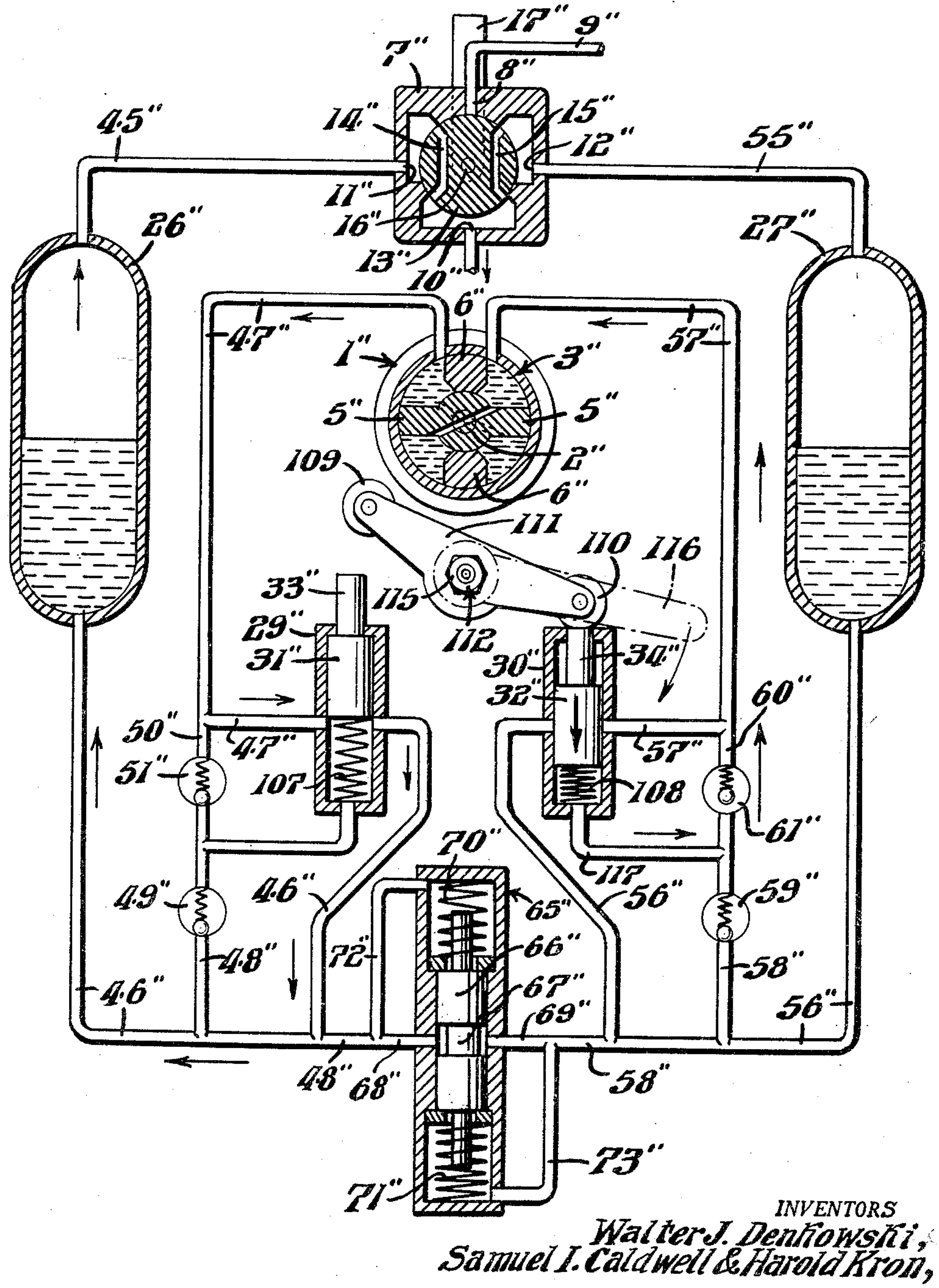

Likewise, except as hereinafter particularly pointed out, the modified apparatus illustrated in FIGS. 16–19 is generally similar to that of FIGS. 1–10 and, here again, in order to dispense with repetitive description, corresponding parts will be identified by the same reference numerals previously employed but with addition, in each instance, of double primes. In this modification, the two manually operable pumps 29″ and 32″ are mounted side-by-side in a housing 105 (FIG. 16) secured to the front of the actuator 3″ atop the trunk line valve 1″, and the control valve 7″ is affixed to the front of said housing. As shown in FIGS. 17–19, the pistons 31″ and 32″ of the cylinders 29″ and 30″ are subject respectively to compression springs 107 and 108, and their rod extensions 33″ and 34″ are both engaged normally with rollers 109 and 110 at opposite ends of a rocker arm 111. This rocker arm 111 is affixed to the outer end of a shaft 112 rotatively borne in upstanding brackets 113 and 114 of the housing 105, said shaft having a polygonal head 115 for application thereto of an actuating handle such as shown in broken lines at 116.

Normally, with the control valve 7″ in the neutral position of FIG. 17, the tank 26″ is in communication with the tank 27″ by way of the piping 46″, 48″ and 68″, the groove 67″ in the piston 66″ of valve 65″ and piping 69″, 58″ and 56″ with the liquid in said tanks at a common level as in the first described embodiment. To close the trunk line valve by power, the control valve 7″ is turned counterclockise to the position of FIG. 18, and pressurized air or gas is conducted into the top of the tank 27″ with attendant displacement of liquid from said tank through piping 56″, pump 30″ and piping 57″ to the right side of the actuator 3″ to turn the rotor thereof clockwise as required, part of the pressurized liquid flowing from the piping 56″ through pipe section 73″ into the bottom of valve 65″, causing the plunger 66″ thereof to be raised and so temporarily prevent direct communication between the tanks 26″ and 27″. At the same time, the fluid displaced from the left side of the actuator 3″ is conducted via the piping 47″, pump 29″ and piping 46″ into the tank 26″.

Manual closing of the trunk line valve 1″ is effected by means of the pump 30″ as shown in FIG. 19, i.e., by applying the handle 116 to the polygonal head 115 on the shaft 112 of the rocker arm 111 and moving the handle up and down repeatedly between the positions in which it is shown in FIGS. 17 and 18. During the downward movements of the piston 32″ of the pump 30″ against the resistance of the spring 108, liquid is displaced from the bottom of said pump, through the piping 117 and past the check valve 61″, into the right side of the actuator 3″, as a consequence of which the rotor of said actuator is turned clockwise to close the trunk line valve 1″. During the up stroke of the piston of pump 30″, liquid is drawn from tank 27″ through the piping 56″, 58″, valve 59″ and pipe 117, into said pump the check valve 59″ opening in response to suction.

Manual opening of the trunk line valve in this modification is accomplished by using the hand pump 29″ in a like manner which, it is believed, will be readily understood without separate illustration and description.

While in accordance with the provisions of the statutes, we have illustrated and described the best forms of embodiment of our invention now known to us, it will be apparent to those skilled in the art that changes may be made in the forms of the apparatus described without departing from the spirit and scope of the invention as set forth in the appended claims, and that in some cases certain features of our invention may be used to advantage without a corresponding use of other features.

Having thus described our invention, we claim:

1. In a fluid system; a reversible torque actuator having a movable member and pressure and exhaust connections; a normally closed multi-way hand control valve in communication with a supply of gas under pressure; a pair of liquid-containing tanks; pipes leading from opposite sides of the control valve and connecting into the tops of the respective tanks; other pipes leading respectively from the bottom of the tanks to the pressure and exhaust connections of the actuator whereby, upon movement of the control valve in one direction, pressurized gas is admitted into the top of one tank with consequential displacement of liquid therefrom into one of said connections of the actuator to move the movable member of the actuator in one direction while liquid is displaced from the other of said connections into the other tank, and vice versa when the control valve is moved in the opposite direction; auxiliary means operable to move the movable member of the actuator in the event of failure of the gas supply, said auxiliary means including a pair of separate manually-operable pumps together with suction and pressure responsive check valves interposed in said other pipes which lead to the actuator; tank-leveling piping by way of which the two tanks are normally communicative for maintenance of a common liquid level in them; and a normally open leveling valve connected in the tank-leveling piping closing automatically in response to fluid pressure during gas-pressure operation of the system.

2. Apparatus according to claim 1, wherein said leveling valve has a casing and a pair of ports in said casing to which the tank-leveling piping is connected; a fluid passage within said casing coupling said pair of ports, closure means within said casing for blocking said passage; and spring biasing means for maintaining said passage normally open except when over-ridden by fluid pressure from one of said tanks.

3. In a fluid system for operating a reversible actuator having a cylindrical casing with a vaned rotor therein said rotor being restricted to a semi-rotation in one direction or the other between a pair of diametral partitioning walls within the casing; a normally closed four-way hand control valve in communication with a source of gas under pressure; a pair of liquid containing tanks; piping leading from one side of the control valve and connecting into the top of one tank; a three-way valve having upper and lower chambers, an intermediate chamber, a spring-backed ball normally closing a port between the lower and intermediate chambers and a ball actuating plunger with its opposite ends exposed in the upper and intermediate chambers; a pipe extending from the bottom of said one tank and connecting into the intermediate chamber of the three-way valve; a pipe extending from the lower chamber of the three-way valve and connected to one side of the actuator; a similar second three-way valve; a pipe extending from the bottom of the other tank and connecting into the intermediate chamber of the second three-way valve and connected to the other side of the actuator; a pipe extending from the upper chamber of the first three-way valve to the pipe which extends to the said other side of the actuator; and a pipe extending from the upper chamber of the second three-way valve and connecting into the pipe which extends to the first mentioned side of the actuator.

4. The invention according to claim 3, further including manually operable pumps, with suction and pressure responsive check valves, interposed respectively in the pipes which lead from the bottoms of the tanks and connect respectively into the opposite sides of the actuator.

5. The invention according to claim 4, further including a double-acting valve having therein a plunger with a medial circumferential groove and spring means for normally maintaining the plunger centralized in the casing of said valve; a pipe section leading from the pipe which extends from the bottom of the first tank and connecting into one side of the casing of the double-acting valve at the center and also into the top of said valve; and a pipe section leading from the pipe which extends from the bottom of the second tank and connecting into the other side of the double-acting valve at the center and also into the bottom of said valve.

6. In a fluid system; a reversible actuator having two fluid connections either one of which serves as an exhaust port when the other serves as a pressure port; first and second tanks; first and second manually operable pumps comprising a pair of parallel disposed cylinders each having therein a piston having connected thereto a piston rod which extends outwardly from one end of the cylinder; spring means in each cylinder for maintaining each piston normally in a fully biased position in its respective cylinder against a limit stop; a shaft rotatably mounted between said pair of cylinders having a manually movable double-arm rocker fixed thereto in such position that each of said outwardly extended piston rods engages a same one side of a different one end of said rocker, whereby said rocker is maintained in a normal position by the pistons in their fully biased normal position; a pressure port in the end of each cylinder remote from said piston rod; bypass means comprising an intake port and an exhaust port in the piston chamber of each cylinder immediately beyond the extremity of the piston when sai piston is in said fully biased position; first and second fluid conduits connecting said first and second tanks respectively to said one and other of said ports of said actuator, each of said first and second fluid conduits comprising: first, second, and third main sections, first and second check valves in said first and second main sections respectively connected to allow fluid flow in the direction from said tank to said actuator and to prevent flow in the reverse direction, a first branch conduit connecting said first main section to said bypass intake port in the piston chamber of said cylinder, a second branch conduit connecting the junction of said first and second main sections to the pressure port in the piston chamber of said cylinder, and a third branch conduit connecting the junction of said second and third main sections to said bypass exhaust port in the piston chamber of said cylinder, whereby when said double-arm rocker is moved from its normal position one only of said pistons is moved inwardly from its fully biased position, the other remaining stationary, both of said bypass ports in the piston chamber of said moved piston being immediately closed by said moved piston and fluid pressure applied to one port of said actuator through said pressure port of said moved piston chamber, said second branch conduit, said second main section, said second check valve and said third main section, said actuator exhausting through its said other port, the other third main section, the bypass ports of the other cylinder, and the other first main section to said other tank.

7. Apparatus as claimed in claim 6 characterized in that a leveling valve is coupled between said first main sections of said first and second fluid conduits for normally maintaining the fluid in each of said tanks at substantially the same level, said leveling valve having two ports, each connected to one of said first main sections, an internal fluid passage between said ports in said leveling valve, spring-biased closure means in said leveling valve normally maintaining said internal fluid passage open, the bias of said spring-biased closure means being adapted to be over-ridden by fluid pressure applied in either direction to close said normally-open internal fluid passage, thereby to close the connection between said first main sections of said first and second fluid conduits when fluid pressure is applied to either port of said actuator.

8. Apparatus as claimed in claim 6 characterized in that a control valve is provided for controlling the application of gas pressure to said tanks, said control valve having first, second, third, and fourth ports, conduit means coupling said first and second ports to the tops of said first and second tanks respectively, means coupling said third port to a source of gas pressure, and means coupling said fourth port to exhaust, and control means for controlling the position of said valve to connect either one of said first or second ports to said third port and the other of said first of second ports to said fourth port.

9. Apparatus as claimed in claim 7 characterized in that a control valve is provided for controlling the application of gas pressure to said tanks, said control valve having first, second, third, and fourth ports, conduit means coupling said first and second ports to the tops of said first and second tanks respectively, means coupling said third port to a source of gas pressure, and means coupling said fourth port to exhaust, and control means for controlling the position of said valve to connect either one of said first or second ports to said third port and the other of said first or second ports to said fourth port.

10. In a fluid system; a reversible actuator having two fluid connections either one of which serves as an exhaust port when the other serves as a pressure port; first and second liquid-containing tanks; first and second fluid conduits connecting said first and second tanks to said one and other of said ports of said actuator; a leveling valve coupled between said first and second fluid conduits for normally maintaining the liquid in each of said tanks at substantially the same level, said leveling valve having two ports, one each connected to one each of said first and second fluid conduits, an internal fluid passage between said ports of said leveling valve, spring-biased closure means in said valve normally maintaining said internal fluid passage open between said ports, said bias of said spring-biased closure means being adapted to be over-ridden by fluid pressure applied in either direction to close said normally open internal fluid passage, thereby to close the connection between said first and second fluid conduits when fluid pressure is applied to either port of said actuator; and a control valve for controlling the application of fluid pressure to said tanks, said control valve having first, second, third, and fourth ports, conduit means coupling said first and second ports to the tops of said first and second tanks respectively, means coupling said third port to a source of fluid pressure, and means coupling said fourth port to exhaust, and control means for controlling the position of said valve to connect either one of said first or second ports to said third port and the other of said first or second ports to said fourth port.

11. In a fluid system; a reversible actuator having an output member and two fluid connections, said connections serving alternately as pressure and as exhaust ports; a pair of liquid-containing tanks, each having a fluid connection at the top and at the bottom; a double-armed rocker; a pair of similar, single-acting, manually operable pumps comprising two parallel cylinders each having slidably mounted therein a piston with a piston rod extending outwardly to the exterior of the cylinder and spring means for maintaining each piston normally biased toward one end of its respective cylinder, said piston in said normally biased position being limited by the end of the cylinder through which each piston rod projects to the near side of the extremities of the divergent arms of said double-armed rocker but without being secured thereto, said rocker being affixed to a shaft having formed on one end means for attaching an operating hand lever, said shaft being pivotably mounted between said cylinders, said rocker being influenced jointly by the combined piston spring means into a normally centralized position, an intake port and an exhaust port for each cylinder with a bypass interconnecting same through the medium of the cylinder immediately beyond the inward extremity of the respective piston when the piston is in its normally biased position, such that initial movement of the piston blocks passage of liquid through the said bypass; a first fluid passageway interconnecting the intake port with the end portion of the cylinder remote from the rocker, said first passageway including a check valve limiting the fluid flow therethrough to a direction from said intake port into the cylinder; a second fluid passageway interconnecting said remote end portion of the cylinder with the exhaust port, said second passageway including a check valve limiting the fluid flow therethrough to a direction from said cylinder into said exhaust port; a pipe connecting the bottom of one tank with the intake port of one pump; a second pipe connecting the botttom of the second tank with the intake port of the second pump; means connecting the exhaust port of each pump with a connection of the reversible actuator; liquid sufficient to fill the actuator, pumps, and connecting pipes and to partially fill each tank, whereby, upon manipulation of the operating hand lever in one direction, force is transmitted to one pump piston causing first the blocking of said one pump bypass and then displacement of liquid from said one pump through its exhaust check valve into one side of the actuator to move the output member of said actuator in one direction with consequent displacement of liquid from the other side of the actuator into said second pump exhaust port, which displaced liquid, being unable to flow in opposition to the check valves, flows through the bypass beyond the retracted said second piston and thence into the said second tank, causing the liquid level to rise in that tank, and upon returning the operating hand lever to its normally centralized position, the spring means effects retraction of said one pump piston during which retraction the intake check valve opens to admit replenishing of said one pump cylinder with liquid from said one tank, final retractive motion of said one piston uncovers the bypass which relieves pressure existing in the actuator; whereby continued oscillation of said lever will impart reciprocatory movement to said one pump piston to effect a continual unidirectional movement of the output member of said actuator; and conversely, upon manipulation of said operating hand lever in the second direction, continued oscillatory motion of said lever will impart reciprocatory movement to said second pump piston to effect a continual unidirectional movement of the output member of said actuator in the opposite direction.

12. Apparatus according to claim 11, further including a leveling valve in communication with the bottom connection of each liquid-containing tank for normally effecting a liquid level common to both said tanks, said leveling valve having closure elements and means biasing said closure elements to provide fluid intercommuncation therethrough when neither liquid-containing tank is under pressure and to prohibit fluid intercommunication therethrough in response to pressure existing in either liquid-containing tank.

13. Apparatus according to claim 11, further including control valve means in communication with a source of gas pressure; two pipes, each connecting into the top of one of said liquid-containing tanks and also connecting into said control valve means, said control valve means being adapted to selectively block the flow of pressurized gas and simultaneously connect both tanks with exhaust, said control valve being adapted also to selectively connect either of said tanks with exhaust and the other tank simultaneously with the pressurized gas source with consequent displacement of liquid therefrom through the associated pump bypass into the actuator causing the output member thereof to move with resulting displacement of liquid from the other side of said actuator through said other side associated pump bypass and thence into the bottom of the tank presently vented causing a rising liquid level with continuous expulsion of air or gas existing above the liquid within the tank during the movement of said actuator output members.

14. Apparatus according to claim 13, further including a leveling valve in communication with the bottom connection of each liquid-containing tank for normally effecting a liquid level common to both said tanks, said leveling valve having closure elements biased to provide fluid intercommunication therethrough when neither said liquid-containing tank is under pressure and to prohibit fluid intercommunication therethrough in response to pressure existing in either of said liquid-containing tanks.

15. In a fluid system; a reversible actuator having an output member and two fluid connections, said connections serving alternately as pressure and as exhaust ports; a pair of liquid-containing tanks, each having a fluid connection at the top and at the bottom; a first pipe connecting the bottom of one tank with one of the actuator connections; a second pipe connecting the bottom of the second tank with the second actuator connection; a leveling valve in communication with the bottom connection of each said liquid-containing tank for normally effecting a liquid level common to both said tanks, said leveling valve having closure elements biased to provide fluid intercommunication therethrough when neither said liquid-containing tank is under pressure and to prohibit fluid intercommunication therethrough in response to pressure existing in either one of said liquid-containing tanks; liquid sufficient to completely fill the actuator, leveling valve, and connecting pipes, and to partially fill each tank; control valve means in communication with a source of gas under pressure; two pipes, each connecting into the top of one of said liquid-containing tanks and also connecting into said control valve means, said control valve means being adapted to selectively block the flow of pressurized gas and to simultaneously connect both tanks with exhaust, said control valve means being adapted also to selectively connect either of said tanks with exhaust and the other tank simultaneously with the pressurized gas source with consequent displacement of liquid under pressure therefrom to said leveling valve, wherein the pressure responsive closure elements prevent further fluid intercommunication therethrough between the two tanks, and provide fluid pressure into the actuator causing the output member thereof to move with resulting displacement of liquid from the other connection of said actuator through the associated pipe and thence into the bottom of the tank presently vented causing a rising liquid level with continuous expulsion of gas existing above the liquid within the tank during the movement of said actuator output member.

16. In a fluid system; a reversible actuator having an output member and two fluid connections, said connections serving alternately as pressure and as exhaust ports; a divergent double-arm rocker; a pair of similar, single-acting, manually-operable pumps comprising tow parallel cylinders each having slidably mounted therein a piston with a piston rod extending outward to the exterior of the cylinder, spring means in each cylinder for maintaining each piston normally fully biased toward one end of its respective cylinder, the so biased position of the piston being limited by the piston-rod end of the cylinders through which both piston rods project to the near side of the extremities of said divergent double-arm rocker, but without attachment thereto, said rocker being affixed to a shaft having formed on one end means for attaching an operating hand lever, said shaft being pivotally mounted between said cylinders, said rocker being influenced jointly by the combined piston spring means into a normally centralized position; an intake port and an exhaust port for each cylinder with a bypass interconnecting said ports through the medium of the cylinder immediately beyond the extremity of the respective piston when the piston is in said biased position such that initial movement of the piston blocks passage of liquid through the said bypass; a first fluid passageway for each cylinder interconnecting the intake port with the end portion of the cylinder remote from the piston rod, said first passageway including a check valve limiting the fluid flow therethrough to a direction from said intake port into the cylinder; a second fluid passageway for each cylinder interconnecting said remote end portion of the cylinder with the exhaust port, said second passageway including a check valve limiting the fluid flow therethrough to a direction from said cylinder into said exhaust port; pipe means connecting the exhaust port of each pump with a connection of the reversible actuator; container means for a liquid supply; and pipe means connecting the intake port of each pump to a point in the liquid container means below the surface of the liquid therein contained, whereby upon manipulation of the operating hand lever in one direction force is transmitted to one pump piston causing first the blocking of said one pump bypass and then displacement of liquid from said one pump through its exhaust check valve into one side of the actuator to force the output member thereof in one direction with consequent displacement of liquid from the other side of the actuator into said second pump exhaust port, which displaced liquid, being prevented from flowing in opposition to the check valves, flows through the bypass beyond said second piston in its biased position and thence back into the liquid container means; and upon returning the operating hand lever to its normally centralized position, the spring means effects movement of said one pump piston toward its normally biased position during which movement the intake check valve opens to permit replenishing of said one pump cylinder with liquid from the liquid container means, final movement of said one piston uncovering the bypass which relieves pressure existing in the actuator, whereby continued oscillation of said lever imparts reciprocatory movement to said one pump piston to effect a continual unidirectional movement of the output member of said actuator, and conversely, upon manipulation of said operating hand lever in the second direction, continued oscillatory motion of said lever will effect a continual unidirectional movement of the actuator output member in the opposite direction.

(References on following page)

References Cited in the file of this patent

UNITED STATES PATENTS

| | | |
|---|---|---|
| 2,037,434 | Pfauser | Apr. 14, 1936 |
| 2,145,540 | Ellis | Jan. 31, 1939 |
| 2,239,893 | Jackman | Apr. 29, 1941 |
| 2,243,648 | Patton et al. | May 27, 1941 |
| 2,371,450 | Langdon | Mar. 13, 1945 |
| 2,422,357 | LeTourneau | June 17, 1947 |
| 2,573,993 | Sedgwick | Nov. 6, 1951 |
| 2,791,093 | Shafer | May 7, 1957 |

FOREIGN PATENTS

| | | |
|---|---|---|
| 123,321 | Australia | Jan. 30, 1947 |